Feb. 21, 1956  H. A. BRAENDLE  2,735,753
MANUFACTURE OF CARBON BLACK
Filed March 29, 1951
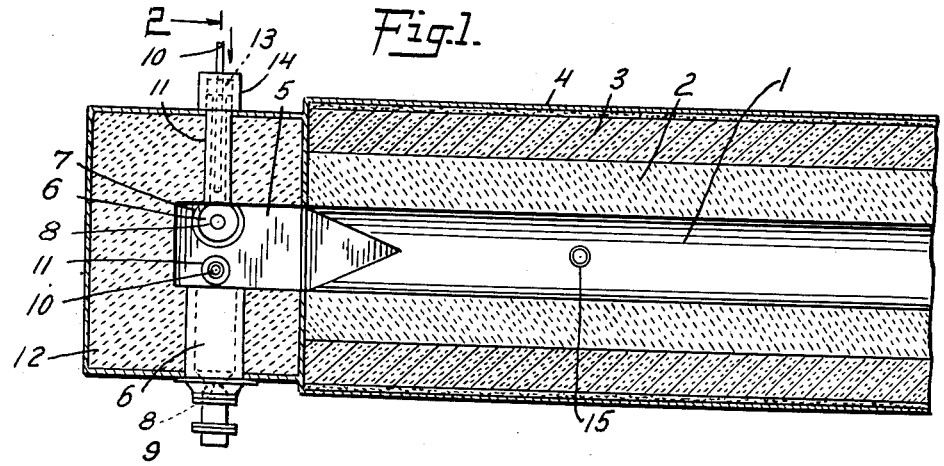
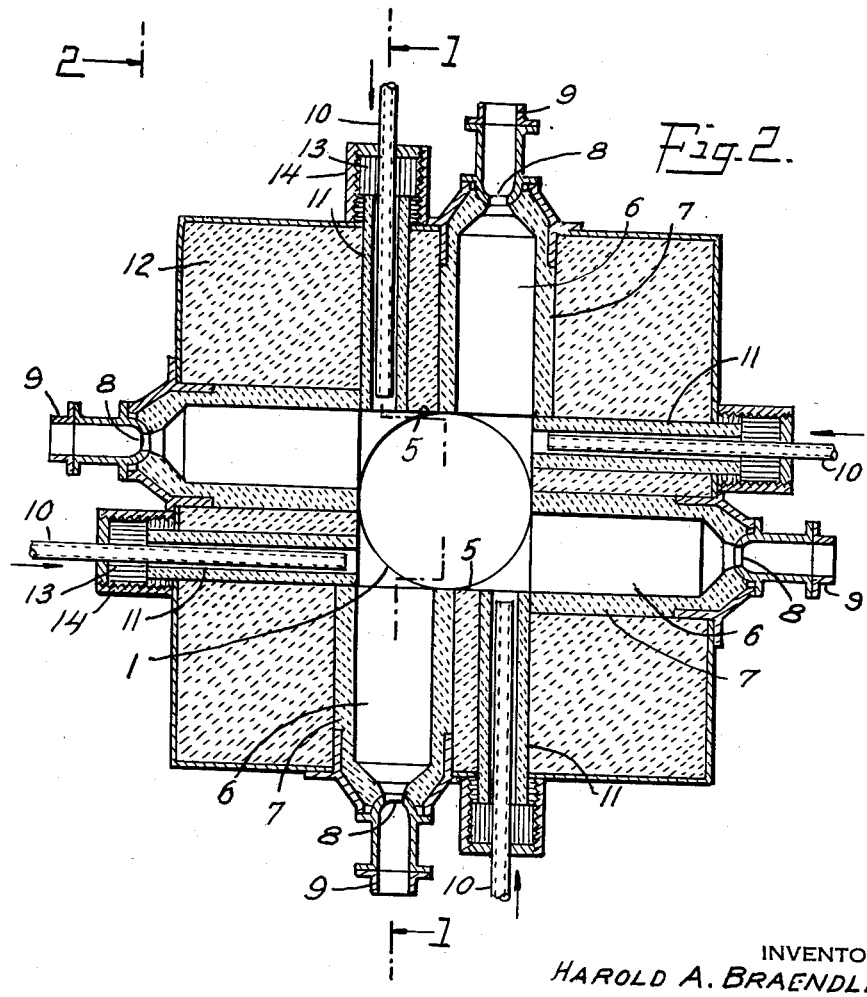
INVENTOR
HAROLD A. BRAENDLE
BY
Rennie, Edmonds, Morton, Barrows & Taylor.
ATTORNEYS

United States Patent Office 2,735,753
Patented Feb. 21, 1956

2,735,753

MANUFACTURE OF CARBON BLACK

Harold A. Braendle, Garden City, N. Y., assignor to Columbian Carbon Company, New York, N. Y., a corporation of Delaware Application March 29, 1951, Serial No. 218,198

5 Claims. (Cl. 23—209.4)

The present invention relates to the production of furnace blacks by the decomposition of hydrocarbons and, more particularly, to a furnace black process of the type in which the hydrocarbon is decomposed by rapidly mixing it with a violently turbulent stream of hot blast flame gases and passed in admixture therewith through an elongated, heat insulated reaction chamber. An operation of this type is described, for instance, in the Wiegand and Braendle Patent No. 2,378,055. The invention provides improvements in the apparatus and process therein described.

In accordance with the process of the patent, just noted, the hydrocarbon to be decomposed, hereinafter referred to as hydrocarbon make, is separately injected into a violently turbulent stream of hot blast flame gases flowing at high velocity through an elongated, heat insulated reaction chamber so that the hydrocarbon make is rapidly mixed with the blast flame gases and quickly and uniformly heated to its decomposition temperature and decomposed by heat absorbed from the hot gases to form carbon black in suspension. The resultant gaseous mixture continues in a state of violent turbulence through the reaction chamber and the gaseous mixture with carbon black suspended therein is passed from the downstream end of the chamber and the carbon black separated and collected.

In operations of the type described, the character of the resultant carbon black is materially affected by the rapidity and uniformity of the mixing of the hydrocarbon make with the hot blast flame gases. Notably, the particle size and rubber compounding characteristics of the resultant black are materially affected thereby. Generally, the more rapid and thorough the mixing, the smaller the carbon black particles, and various means have been proposed to expedite such mixing.

In the procedure specifically illustrated in said patent, the combustible mixture for generating the turbulent stream of blast flame gases is injected into one end of the reaction chamber, substantially parallel to the longitudinal axis of the chamber and the hydrocarbon make is radially injected into the reaction chamber at a point downstream from the point of injection of the combustible mixture. By that procedure, rapid and uniform mixing of the hydrocarbon make with the hot blast flame gases is facilitated, the mixing being so rapid that it has properly been designated instantaneous.

However, the rate of pyrolysis of the hydrocarbon make upon contact with the hot blast flame gases is, likewise, very rapid and generally increases with an increase in temperature of the hot gases and the size of the molecules of which the hydrocarbon make is composed. The time factors involved in the initiation of pyrolysis of the hydrocarbon make as well as the mixing thereof with the hot gases appear to be measurable in micro seconds. Nevertheless, they appear to be of great importance in determining the character of the resultant carbon black, and under conditions just noted, which accelerate the pyrolysis, special problems are presented in the effecting of sufficiently rapid, uniform mixing.

Maximum fineness of subdivision of the resultant carbon black are promoted when the hydrocarbon make is thoroughly dispersed in the hot gas stream before pyrolysis of the former has been initiated or progressed beyond an insipient stage. As previously noted, where higher molecular weight hydrocarbons, for instance, normally liquid hydrocarbons, are used as the hydrocarbon make, or a portion thereof, or where exceptionally high blast flame temperatures are employed, special problems are presented in the effecting of the uniform mixing, or dispersion, as rapidly as desired. Also, where the transverse area of the reaction chamber has been increased in an effort to further increase the capacity of the apparatus, difficulties have been encountered in the effecting of sufficiently rapid, uniform dispersion of the hydrocarbon make in the blast flame gases.

The present invention provides an improved method and means of more rapidly and uniformly mixing the hydrocarbon make with the blast flame gases whereby streams of the hydrocarbon make are injected into separately generated, highly turbulent streams of blast flame gases and the resultant streams of admixed blast flame gases and hydrocarbon make are instantly thereafter subjected to violent impact with like streams of the hot mixture whereby the turbulence of the hot gases is greatly increased and the thorough uniform mixing of the hydrocarbon make therewith materially expedited and accelerated.

In general, the improved process of the present invention comprises the generating of a plurality of streams of hot blast flame gases in separate elongated combustion chambers of relative small transverse area, i. e., small, relative to the transverse area of the reaction chamber, and passing the respective streams at high velocity into a mixing chamber or zone positioned at one end of an elongated, heat insulated reaction chamber of substantially cylindrical cross-section, in a direction substantially at right angles to the longitudinal axis of the chamber and generally tangentially thereto, so as to form a swirling body of gases passing through the chamber, separately injecting streams of the hydrocarbon make into the respective streams of blast flame gases as they flow from the respective combustion chambers into the mixing chamber or zone, the hydrocarbon make being injected in a direction substantially at right angles to the longitudinal axis of the respective combustion chambers, and immediately thereafter causing the respective streams of the resultant mixture to impact violently with other like streams of hot gaseous mixture entering the mixing chamber. The resultant violently turbulent mixture then continues through the reaction chamber as a rapidly swirling gas stream, the hydrocarbon make being decomposed to form carbon black in suspension which is separated from the effluent gases.

In a particularly desirable aspect of the invention, I use four separate combustion chambers symmetrically positioned about the upstream end of the elongated reaction chamber so that their longitudinal axes are substantially perpendicular to the longitudinal axis of the reaction chamber and so that the longitudinal axis of each combustion chamber is substantially perpendicular to the longitudinal axis of each adjacent combustion chamber. Further, the transverse dimension of the respective combustion chambers is, as previously noted, considerably smaller than the diameter of the reaction chamber, generally not over half the diameter of the reaction chamber and, advantageously, somewhat less. The combustion chambers are, with advantage, of circular transverse section or, where desired, may be elliptical, rectangular, or the like. It is further desirable that the outer edge of the respective combustion chambers be substantially tangential to the circumference of the reaction chamber so that the respective entering streams of hot gas mixture will tend to swirl in the same direction about the longitudinal axis of the reaction chamber.

The invention will be further described and illustrated with reference to the accompanying drawings of apparatus especially adapted to the carrying out of the process and in which Figure 1 represents, conventionally and somewhat fragmentarily, a longitudinal view, partly in section, of the essential cooperating elements of the apparatus comprising the reaction chamber, the combustion chambers and means for injecting the hydrocarbon make, and Figure 2 represents a somewhat enlarged transverse, sectional view along line 2—2 of Figure 1.

In the drawing, an enlongated, cylindrical reaction chamber is indicated at 1, delineated by refractory wall 2, covered by heat insulating material 3, all enclosed in a metal casing 4. At its left-hand end, the reaction chamber is extended into a square mixing chamber 5, of height and width equal to the diameter of the cylindrical chamber.

As shown very clearly in Figure 2, four separate cylindrical combustion chambers or tuyeres 6 lead into the mixing chamber and are so positioned that the longitudinal axis of each chamber is perpendicular to the longitudinal axis of the reaction chamber and to the longitudinal axis of each adjacent combustion chamber. Each combustion chamber is delineated by wall 7 of refractory material adapted to withstand the high temperatures of the blast flame gases. At their outer ends, the respective combustion chambers are provided with blast burners 8 to which a combustible mixture of fuel gas and air, for instance, are supplied through conduit 9.

At the entrance of each of the combustion chambers into the mixing chamber, there is provided a hydrocarbon make injection tube 10 projecting through port 11 which extends through wall 12 of the mixing chamber. This tube 10 is adjustably positioned in the port 11 and the outer ends of the respective ports are sealed by asbestos packing 13 and packing glands 14.

Intermediate its ends, the reaction chamber is provided with one or more ports 15 for use in observing conditions within the chamber and for determining temperatures at the various zones thereof.

The particular blast burners shown are of the well-known Maxon type, comprising a 1¼ inch sealed-in Maxon nozzle, adapted to the burning of premixed gas and air. Other types of blast burners capable of producing highly turbulent streams of blast flame gases may be used instead of the type shown.

Also, in the particular apparatus illustrated in the drawing, the mixing chamber, as previously noted, is of rectangular cross-section. This is advantageous from the standpoint of simplicity of construction of the apparatus, but it will be understood that the mixing chamber may be a cylindrical extension of the reaction chamber, advantageously of equal diameter.

In operation, a combustible mixture of fuel gas and air, for instance, is passed to the respective burners 8 through conduits 9 and blasted into the combustion chambers and burned therein to form separate highly turbulent streams of blast flame gases. The resultant streams of blast flame gases pass at high velocity through the combustion chambers into the mixing zone 5. The hydrocarbon make to be decomposed is separately and forcefully injected into the respective streams of the hot blast flame gases as the latter passes into the mixing zone and is mixed therewith.

The mixing of the hydrocarbon make with the respective streams of blast flame gases is promoted by directing the stream of hydrocarbon make into the stream of hot gases at substantially right angles to the direction of flow of the latter. The resultant mixture of hot blast flame gases and hydrocarbon make is then caused almost immediately to impinge upon a similar stream of hot gases passing into the mixing zone from adjacent combustion chambers, thus creating a state of terrific turbulence and a violent cyclonic condition within the mixing zone which further promotes and accelerates the uniform mixing of the hydrocarbon make with the resultant violently turbulent blast flame gas.

The resultant swirling stream of hot gases continues through the reaction chamber and the hydrocarbon make dispersed therein is decomposed by heat absorbed from the hot gases to produce carbon black in suspension. The effluent gases pass from the downstream end of the chamber to conventional separating apparatus and the carbon black recovered therefrom.

The dimensions and relative proportions of the apparatus may be varied within a considerable range. In one apparatus which has been used, with advantage, the reaction chamber was approximately 15 feet long and 7 inches inside diameter, provided at its upstream end with four combustion chambers substantially as shown, each about 3 inches inside diameter and about 6 inches long. Each of the four hydrocarbon injection tubes was ¼ inch inside diameter, and extended coaxially through a port formed by a Carbofrax tube 1 inch inside diameter and 8½ inches long.

Standard, readily available tuyere blocks ranging in size from 7 to 9 inches I. D. may, with advantage, be used as the combustion chambers in the construction of the carbon black furnaces of my present invention. The optimum diameter of the reaction chamber will, of course, depend upon the size and number of tuyere blocks, or combustion chambers, used. It will be appreciated, however, that the transverse area of the reaction chamber should be adequate to carry the composite mixture of hot blast flame gases and hydrocarbon make without excessive back pressure.

By generating separate streams of hot blast flame gases in relatively small combustion chambers and separately injecting the hydrocarbon make into the respective streams, in accordance with my present invention, previous limitations as to transverse area of the reaction chamber are largely avoided. Further, my invention provides a method and means whereby a more rapid, thorough mixing of the hydrocarbon make with the hot blast flame gases may be accomplished, to produce furnace blacks of unusually small particle size, or, particularly in large commercial size apparatus, rapid uniform mixing adequate to produce furnace blacks of conventional particle size is more readily accomplished.

I claim:

1. In the process of producing furnace black by the thermal decomposition of hydrocarbons wherein the hydrocarbon is rapidly and uniformly mixed with hot blast flame gases passing through a confined, elongated reaction chamber and decomposed by heat absorbed from the hot gases to form carbon black in suspension, the suspension being withdrawn from the downstream end of the reaction chamber and the carbon black separated therefrom, the steps comprising generating a plurality of streams of hot blast flame gases and separately passing the respective streams at high velocity into one end of an elongated reaction chamber of substantially cylindrical cross-section in a direction substantially at right angles to the longitudinal axis of the chamber, and generally tangential thereto, separately injecting a stream of the hydrocarbons to be decomposed into each of the respective streams of blast flame gases, just as it enters the reaction chamber, in a direction substantially at right angles to the direction of flow of the hot gas stream, and immediately thereafter, impinging each of the resultant streams of blast flame gases and hydrocarbons at a substantial angle upon an entering adjacent stream of blast flame gases and hydrocarbon and thereby rapidly uniformly mixing the hydrocarbons with the hot gases.

2. The process of claim 1 in which each of the streams of blast flame gases and hydrocarbons is impinged upon said entering adjacent stream at an angle of about 90 degrees.

3. In the process of producing furnace black by the thermal decomposition of hydrocarbons wherein the hydrocarbon is rapidly and uniformly mixed with hot blast flame gases passing through a confined, elongated reaction chamber and decomposed by heat absorbed from the hot gases to form carbon black in suspension, the suspension being withdrawn from the downstream end of the reaction chamber and the carbon black separated therefrom, the steps comprising generating a stream of hot blast flame gases, injecting a stream of the hydrocarbon to be decomposed into said stream of hot gases in a direction substantially at right angles to the direction of flow of the hot gas stream, separately generating a second stream of hot blast flame gases, injecting a stream of the hydrocarbons to be decomposed into said second stream of hot gases in a direction substantially at right angles to the direction of flow of the second hot gas stream, passing the respective resulting streams of hot gases, as the hydrocarbons are being injected into the respective streams, into one end of an elongated reaction chamber of substantially cylindrical cross-section in directions substantially at right angles to the longitudinal axis of said chamber and generally tangential thereto, and, immediately upon entering said reaction chamber, impinging the first stream of hot gases and hydrocarbons at a substantial angle upon the entering second stream of hot gases and hydrocarbons and thereby rapidly uniformly, mixing the hydrocarbons with the hot gases.

4. Apparatus for producing furnace blacks comprising an elongated, heat-insulated reaction chamber of substantially cylindrical cross-section, a plurality of combustion chambers leading into one end of the reaction chamber at substantial right angles with the longitudinal axis of the reaction chamber and in a direction generally tangential to the cylindrical walls thereof, the longitudinal axis of each combustion chamber lying in a common plane perpendicular to the longitudinal axis of the reaction chamber, and forming a substantial angle with that of the next adjacent combustion chamber, a make gas injection tube leading into the reaction chamber directly at the entrance of each combustion chamber thereto and directed across said entrance, means for supplying a combustible mixture to the upstream end of the respective combustion chambers, connections for supplying hydrocarbon to be decomposed to each of the make gas injection tubes, and means for separating furnace black from effluent furnace gases.

5. Apparatus for producing furnace blacks comprising an elongated heat-insulated reaction chamber of substantially cylindrical cross-section, four combustion chambers spaced at 90° angles about the periphery of one end of the reaction chamber, the longitudinal axis of said combustion chambers lying in a common plane perpendicular to the longitudinal axis of the reaction chamber, said combustion chambers opening into the reaction chamber in a direction generally tangential to the cylindrical walls thereof, a make gas injection tube leading into the reaction chamber, directly at the entrance of each combustion chamber thereto and directed across said entrance, means for supplying a combustible mixture to the upstream end of the respective combustion chambers, connections for supplying hydrocarbon to be decomposed to each of the make gas injection tubes, and means for separating furnace black from effluent furnace gases.

References Cited in the file of this patent

UNITED STATES PATENTS

| | | |
|---|---|---|
| 2,153,951 | Barber | Apr. 11, 1939 |
| 2,440,424 | Wiegand et al. | Apr. 27, 1948 |
| 2,564,700 | Krejci | Aug. 21, 1951 |
| 2,599,981 | Ekholm | June 10, 1952 |